Figure 1:
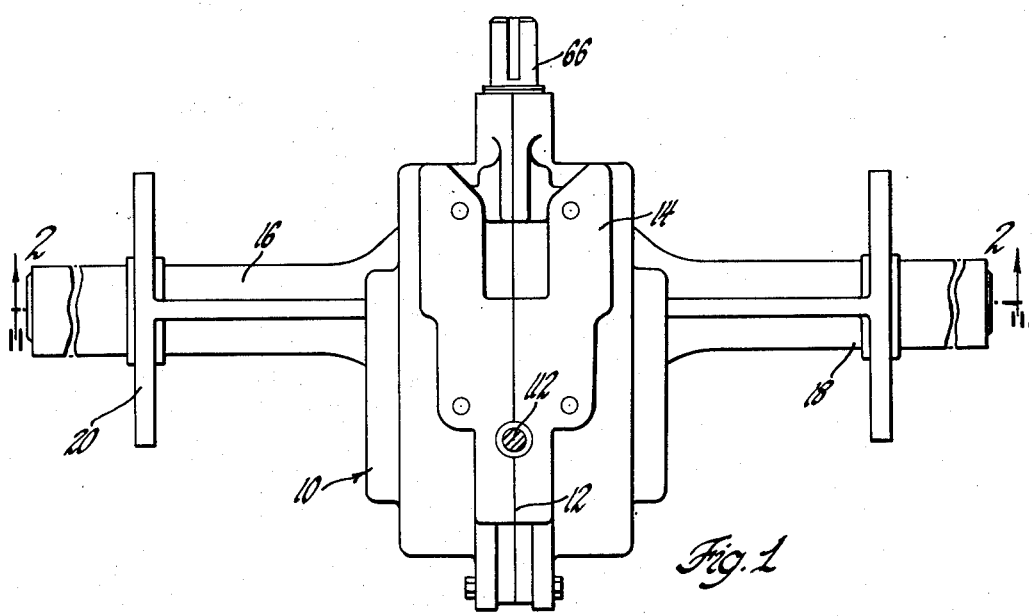

June 29, 1965　　　M. L. OLLMAN　　　3,191,447
TRANS-AXLE DRIVE ASSEMBLY
Filed Oct. 27, 1961　　　　　　　　　　　　　4 Sheets-Sheet 1

INVENTOR.
Melvin L. Ollman
BY Winnie and Bernard
ATTORNEYS

INVENTOR.
Melvin L. Ollman
BY
Winnie and Barnard
ATTORNEYS

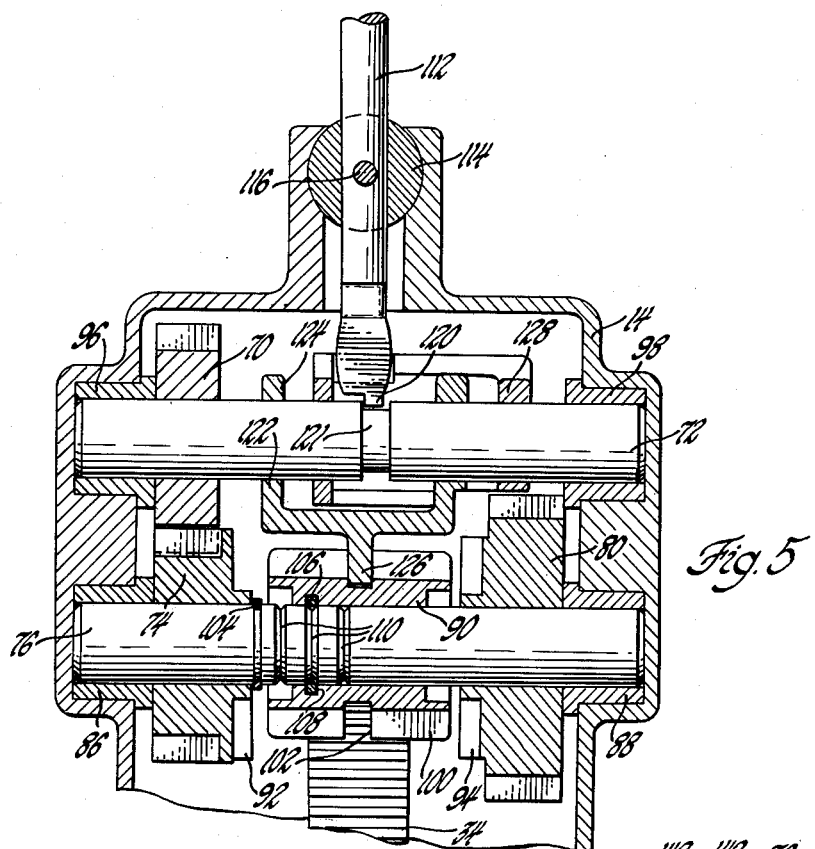
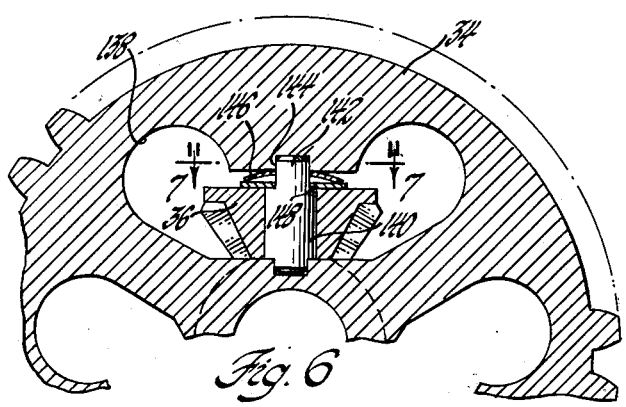
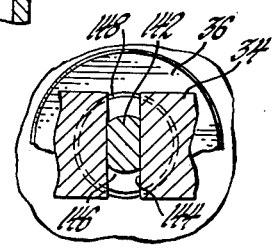

United States Patent Office 3,191,447
Patented June 29, 1965

3,191,447
TRANS-AXLE DRIVE ASSEMBLY
Melvin L. Ollman, Detroit, Mich., assignor to Dura Corporation, Oak Park, Mich., a corporation of Michigan
Filed Oct. 27, 1961, Ser. No. 148,064
20 Claims. (Cl. 74—700)

This invention relates to axle drive assemblies in general, and more particularly to a combination transmission and axle drive assembly for multiple purpose use.

Small equipment manufacturers have great need for compact power transmission and axle drive assemblies to service small motive equipment such as garden tractors, lawn mowers, golf carts and the like where size, weight, initial and maintenance expenses are of prime importance. To date such manufacturers have had to buy separate transmission and axle drive assemblies, usually from different sources for better prices, or to tool-up for the manufacturing of one or both of the units themselves. In those instances in which manufacturers have designed and built suitable drive assemblies for their own purposes they have done so to suit their own particular requirements and have accordingly not made available a drive assembly having general use and acceptance for the many purposes it might serve.

As will be appreciated, a universally acceptable axle drive assembly must provide for multiple forward drive speeds, reverse drive and a differential drive of the motive axles. Further, a suitable means for shifting must be provided and provision made for relatively trouble-free operation. These and numerous other desirable features must be provided for by the use of a minimum of expensive parts and within a compact assembly to obtain a commercially acceptable product where volume production will enable still further price reductions to purchasers and enable competition with existing equipment of like kind.

It is an object of this invention to provide a trans-axle drive assembly wherein a compact multiple speed transmission and axle drive assembly are accommodated within an integral housing.

It is an object of this invention to make use of and improve upon the standard wringer roll transmission, known for its use in early washing machines, to obtain a direct forward or reverse drive through the side gear clutching member and to employ a like principal elsewhere for other optional axle driving purposes.

Another object of this invention is to provide a power transmission wherein certain parts serve different functions and thereby eliminate the needless duplication of expensive parts.

It is also an object of this invention in the use of certain parts to serve multiple functions to provide an improved operating efficiency and an elimination of trouble-prone operating controls otherwise required in multiple speed transmission and trans-axle assemblies.

A further object of this invention is to provide a novel gear clutching and drive line connecting means operable between relatively fixed operating and neutral positions that precludes inadvertent disengagement or engagement yet simple operational control thereof.

A still further object of this invention is to provide a simple gearshift lever control to accomplish the necessary directional and speed changes required to be made and such as enables coordinated actuation of different drive clutching means and precludes simultaneous actuation thereof.

Another important object of this invention is to provide a new and novel axle drive assembly particularly suited for trans-axle use wherein a differential axle arrangement is powered by a bevel gear carrying gear member supported on and between the drive axles.

In this latter respect, it is also an object of this invention to provide a differential axle drive means including means for minimizing inadvertent reactionary drive between the axle members.

These and other objects and advantages in the practice of this invention will be more apparent upon reading the following specification having reference to the accompanying drawings showing a preferred embodiment of this invention.

Figure 2:
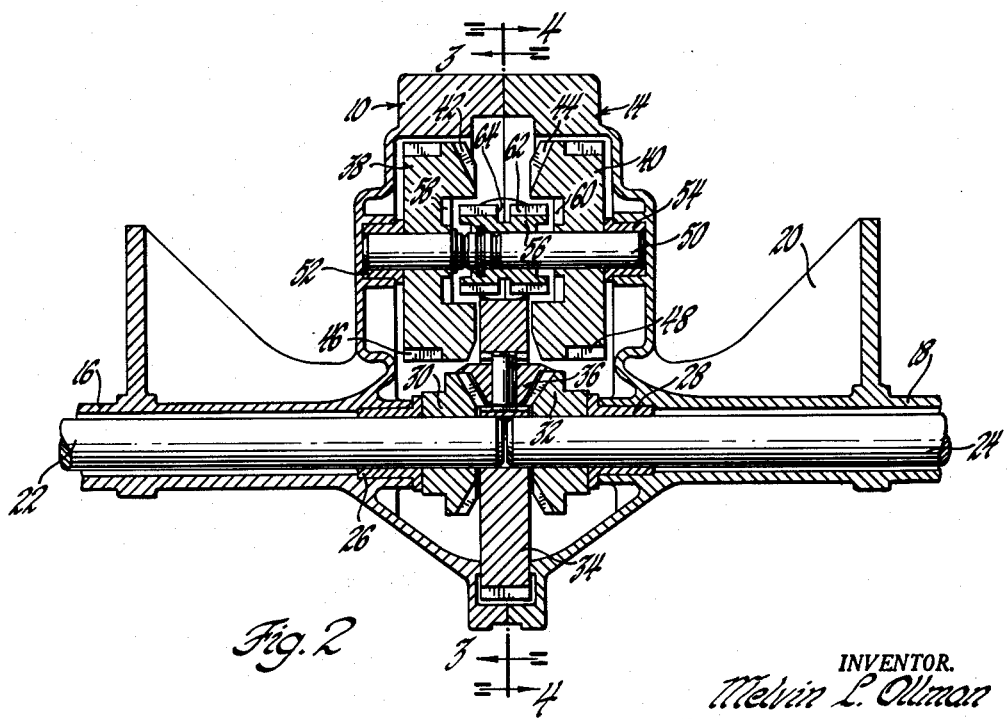
Figure 3:
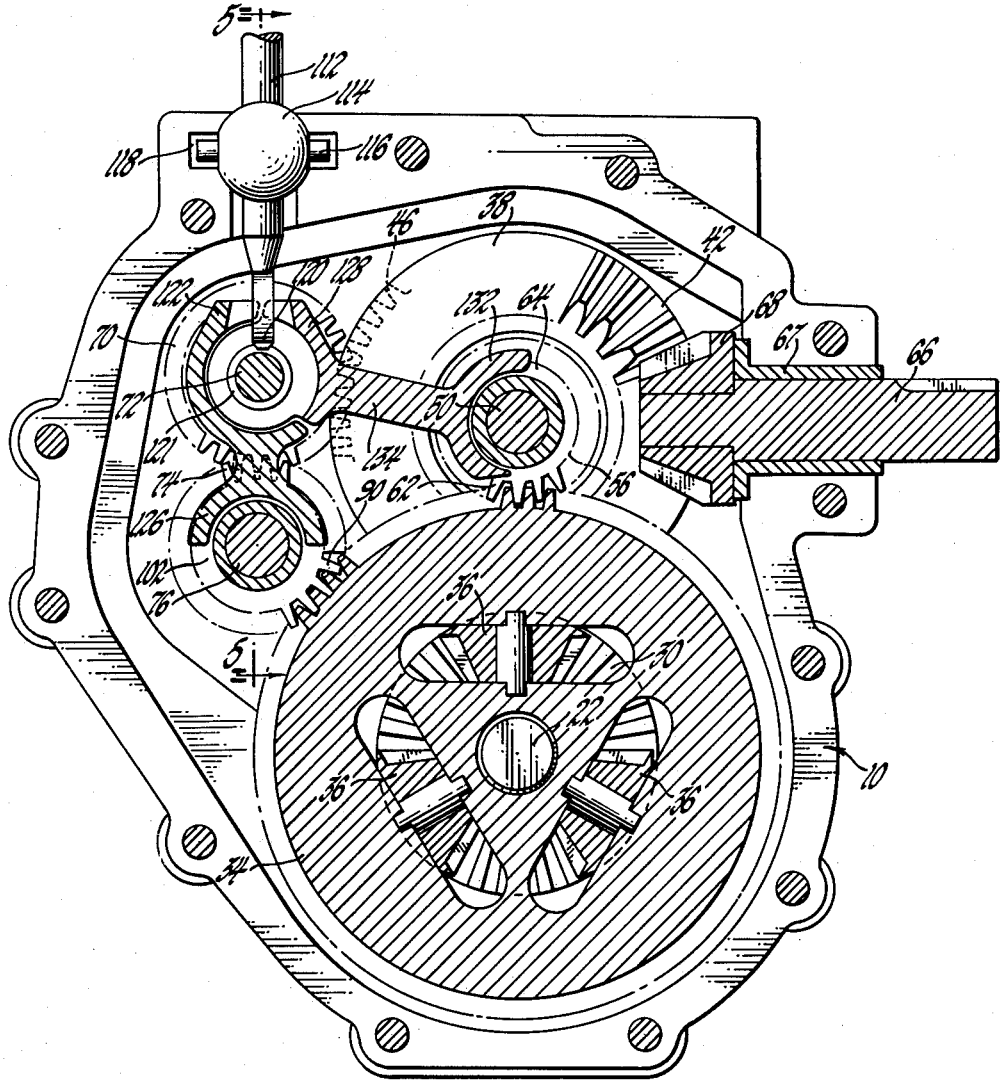
Figure 4:
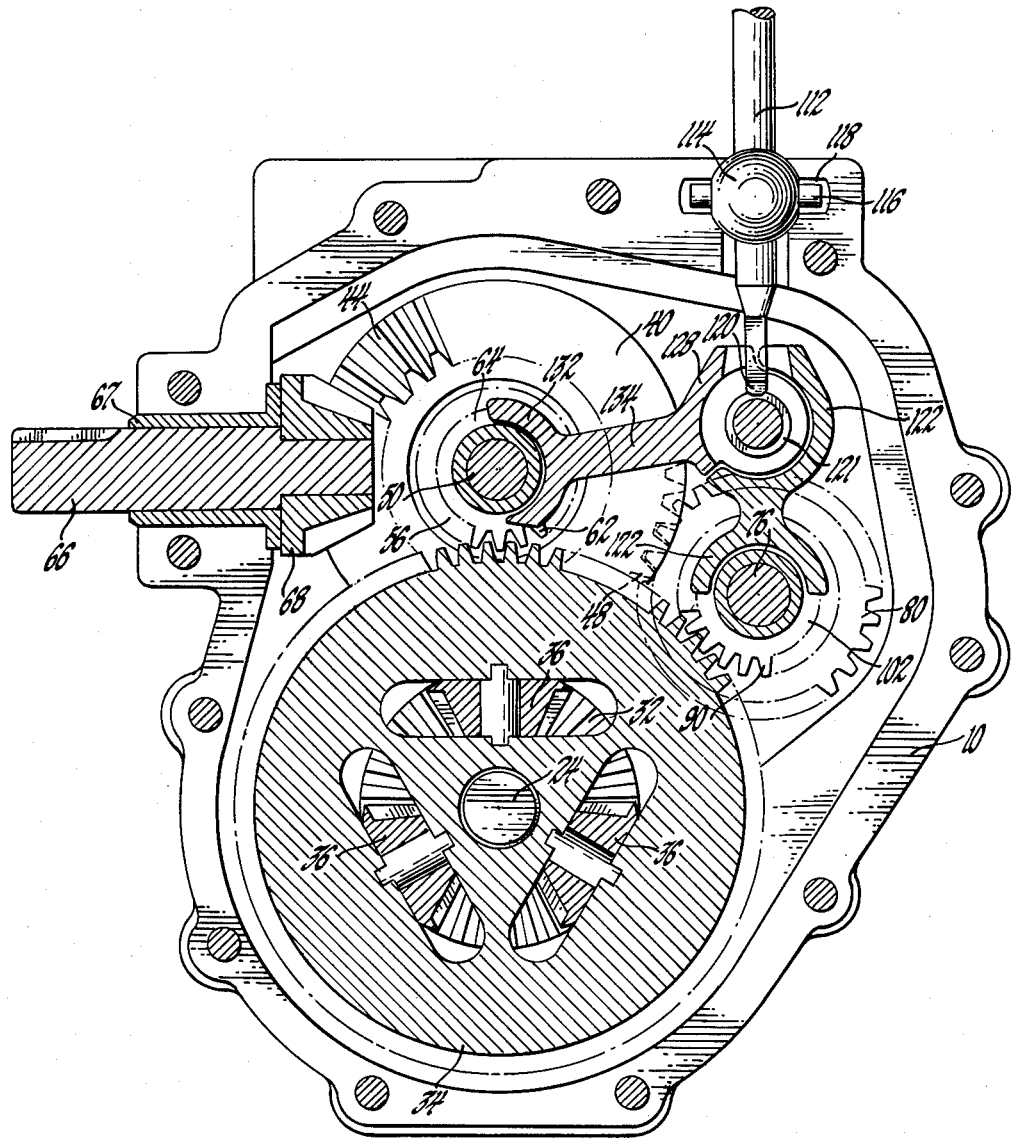

In the drawings:
FIGURE 1 is a top plan view of the trans-axle assembly of this invention;
FIGURE 2 is a cross-sectional view of the trans-axle assembly shown by FIGURE 1 as seen in the plane of line 2—2 thereon and looking in the direction of the arrows;
FIGURE 3 is an enlarged center line cross sectional view of the trans-axle assembly of this invention as seen in the plane of line 3—3 in FIGURE 2 and looking in the direction of the arrows thereon;
FIGURE 4 is an enlarged center line cross sectional view of the trans-axle assembly of this invention as seen in the plane of line 4—4 of FIGURE 2 and looking in the direction of the arrows thereon;
FIGURE 5 is a further enlarged cross sectional view of the gearshaft control feature as seen in the plane of line 5—5 of FIGURE 3 and looking in the direction of the arrows thereon;
FIGURE 6 is an enlarged and fragmentary side plan view of the differential axle drive assembly;
FIGURE 7 is an enlarged detailed view of a pinion gear retaining feature provided in the differential axle drive gear as seen in the plane of line 7—7 of FIGURE 6, looking in the direction of the arrows thereon.

As will be hereinafter described in further detail, the trans-axle of this invention makes use of a combination transmission and axle housing wherein bevel tooth side gears are provided in the transmission part and a reciprocal clutch member is disposed therebetween for engagement with one or the other thereof. A differential axle is provided within the axle housing part and is driven by a pinion gear carrying bull gear engaged with the side gear clutching member. This affords the option of a forward or reverse drive. In addition, the side gears are provided with spur gear teeth and are each part of separate gear trains selectively connected to the axle driving bull gear by a second clutch member to obtain a 2nd or 3rd speed forward drive. By a novel gearshift arrangement one or the other of the clutch member is engaged with one of the side gears for selected 1st, 2nd or 3rd forward or reverse drive of the output axles.

The trans-axle assembly of this invention makes use of a single housing 10 which includes transmission and axle housing portions. The housing is a two part structure divided at the center line 12. Within the transmission housing portion 14 is disposed the different gear members and the gearshift mechanism for obtaining the multiple forward and reverse speeds which have been mentioned.

The axle housing portion of the integral housing 10 includes the axle housing sleeves 16 and 18 each having part of the transmission housing portion 14 provided on the adjacently disposed ends thereof and structurally reinforced by the webs and mounting flanges 20.

Drive axles 22 and 24 are journaled within suitable bearings 26 and 28 within the axle housing sleeves 16 and 18. Axle driving bevel gears 30 and 32 are provided on the ends of the axle shafts. A bull gear 34 is rotatably mounted and supported on the adjacently disposed and aligned ends of the axle shafts and serves as a carrier for beveled toothed pinion gears 36 disposed for drive engagement with the axle gears 30 and 32.

A pair of side gears 38 and 40 are mounted within the transmission housing portion 14. The side gears include beveled gear teeth 42 and 44, respectively, which are engaged with and driven by a beveled tooth gear on the end of the assembly drive shaft, which will be described later. The side gears 38 and 40 are also formed to include spur gear teeth 46 and 48, respectively.

The side gears 38 and 40 are mounted on a shaft 50 provided within the transmission housing portion. Suitable bushing members 53 and 54 are provided on the ends of the shaft within receptive parts of the housing walls. The side gears 38 and 40 are freely rotatable on the shaft 50 and are retained in the positions shown by suitable lock ring or other conventionally known means.

A clutch member 56 is rotatably disposed on the shaft 50 between the side gears 38 and 40. In this instance the clutch member 56 is a dog pawl clutch having its ends formed for engagement with suitable webs 58 and 60 provided on the adjacently disposed sides of the side gears 38 and 40, respectively. The clutch member 56 is also provided with spur gear teeth 62 and is disposed in engagement with the axle shaft driving bull gear 34. The clutch member 56 is provided with a circumferential groove 64 which is receptive of means for shifting the clutch member between neutral and side gear engaging positions by means which will be described later.

FIGURE 3 shows a drive shaft member 66 journaled within a receptive bearing 67 within the trans-axle housing 10 and having a beveled drive gear 68 provided on the end thereof and disposed for engagement with the side gears 38 and 40 (only side gear 38 being shown in this view). The clutch member 56 is shown mounted on the shaft 50 and engaged with the axle driving bull gear 34.

The spur gear teeth 46 of the side gear 38 are shown in meshing engagement with the spur gear teeth of a gear member 70 provided on a shaft 72. The gear member 70 is part of a gear train assembly which includes another spur gear toothed member 74 provided on a shaft 76 and disposed behind another gear toothed member 90 on the same shaft and which is in turn engaged with the bull gear 34.

FIGURE 4 shows the drive shaft 66 having its beveled drive gear 68 engaged with the side gear 40 and the clutch member 56 mounted with the side gear on the shaft 50 and disposed for driving engagement with the bull gear 34. A gear member 80 provided on shaft 76 is disposed for driving engagement with the spur gear teeth 48 of the side gear 30. The gear toothed member 90, which is yet to be described, is provided on the same shaft and is disposed for driving engagement with the bull gear 34 which drives the axle shafts 22 and 24.

Referring now to FIGURE 5, the shaft 76 is shown to be mounted within suitable journal bearings 86 and 88 provided within the housing side walls and to have the gear toothed member 90, which is also a clutch member, provided thereon and between the gear toothed members 74 and 80 which were previously mentioned. The gear toothed clutch member 90 is engaged with the bull gear 34 and includes a dog pawl ends which are engageable with webs 92 and 94 provided on the adjacent sides of the gear members 74 and 80, respectively.

As will be noted, the gear member 70 on shaft 72 is engaged with the gear member 74 on the shaft 76. Suitable journal bearings 96 and 98 receive the ends of the shaft 72 within suitable recesses provided in the housing side walls.

The clutch member 90 is shown to include spur gear teeth 100 for engagement with the gear teeth of the bull gear 34 and to have a circumferential groove 102 provided therearound.

A lock ring 104 is shown provided on shaft 76 to hold the gear 74 in the position shown. As will be appreciated, like means may be used wtih other of the gear members.

A C-ring groove is provided in the clutch member 106 and is receptive of a C-ring 108 which is in turn receptive within any of the C-ring grooves 110 provided in the shaft 76 for axial positioning of the clutch member between a neutrally disposed position and one wherein it is engaged with one or the other of the gear members 74 or 80.

As should be appreciated from the description thus far, the shifting of the clutch member 56 for engagement with either of the side gears 38 or 40 will provide either forward or reverse drive through the engagement between the clutch member and the bull gear 34. Further, engagement of the second clutch member 90 with either of the gear members 74 or 80, while the first clutch member 56 is in a neutral position, will provide a second or third forward drive connection through the gear train engagement of such gear members between the bull gear 34 and the spur gear teeth of one or the other of the side gears 38 and 40.

The clutch members 56 and 90 are selectively operated by a gearshift lever 112 extending into the transmission part 14 of the trans-axle housing 10 and received through a ball socket pivot joint 114. The ball socket arrangement 114 includes trunnion pins 116 which are guided within elongated slots 118 in the housing side walls to enable a limited degree of transverse movement in comparison with the movement to be described as necessary to shift the clutch members into their different positions. This limited transverse freedom of movement is sufficient to enable the tongue end 120 of the shift lever 112 to clear a circumferential groove 121 provided within the shaft 72 and to thereafter move axially on one side or the other of such shaft to shift certain clutch actuating members hereafter described.

A clutch actuating gearshift member 122 is mounted on the shaft 72 and disposed for engagement by the end of the gearshift lever 112. A similar gearshift member 128 is disposed on the same shaft and in overlapping relation to the other gearshift member 122. These two gearshifting members include means of engagement with the different clutch members 56 and 90.

The gearshift member 122 is a sleeve member having end walls through which the shaft 72 extends. It is suitably cut-away as at 124 to allow the overlapping disposition of the other gearshift member 128 which is similarly formed and supported on the shaft 72. The gearshift member 122 includes a depending bifurcated part 126 disposed centrally thereof and which is received within the circumferential groove 102 in the clutch member 90. A similar bifurcated part 132 on the end of an extension arm 134 is provided on the gearshift member 128 and is disposed for engagement within the circumferential groove 64 of the clutch member 56.

FIGURES 3-5 show that the tongue end 120 of the gearshift lever 112 must be pivoted out of the groove 121 in the shaft 72 before it can be moved axially of the shaft such that subsequent axial movement will in turn axially shift one or the other of the gearshift members 122, 128 and effect engagement of one of the clutch members 56, 90 for the desired forward, reverse, second or third speed forward drive which is desired. Since the tongue end of the shift lever 112 must be returned to the location of the circumferential groove 121 in the shaft 72 before it can cross over between the two gearshift members 122 and 128, only one or the other of the clutch members will be actuated at any one time and the other will be in the neutral position. Accordingly, the gearshift arrangement is essentially trouble-proof.

Upon rotation of the bull gear 34, through drive engagement effected by either of the clutch members 90 or 56, the beveled toothed pinion gears 36 will rotate with the bull gear and will drive the bevel gears 30 and 32 on the ends of the drive axles 22 and 24. If either axle should meet resistance the beveled toothed pinion gears will be driven and effect a reactionary drive of the other axle shaft.

The beveled toothed pinion gears 36 are mounted within the bull gear 34, which serves as their carrier, in a manner which precludes a reactionary drive of either axle as a result of unimportant and minor differences in drive resistance in the drive axles. Such means are best shown by FIGURES 6 and 7.

The bull gear 34 is provided with cut-away sections 138 receptive of the beveled toothed pinion gears 36 therein. The pinion gears are rotatable on a pivot pin 140 having flat sided ends 142. Transverse slots 144 are formed to receive the flat sided ends 142 of the pivot pin therein. Accordingly, the pinion gears 36 are held centered within the bull gear principally by their engagement with the beveled gears 30 and 32 on the ends of the axle shafts 22 and 24, respectively.

The beveled toothed pinion gears 36 are spring loaded within the gear carrying accesses 138 of the bull gear by means of a Belleville spring 146 engaging the outer disposed wall of the access and seated on a washer 148 engaging the pinion gear. This spring loading prevents free floating of the pinion gears by assuring a degree of frictional resistance to rotation and thereby precludes unintentional rotation of the pinion gears 36 and reactionary drive of one axle shaft due to a slight difference in drive resistance between the two axle shafts.

Although a preferred embodiment of this invention has been shown and described, it will be appreciated that certain modifications and improvements are within the scope of teachings set forth. Such modifications and improvements as are within the teachings and spirit of this invention and are so specifically excluded by the language of the hereinafter appended claims are to be considered as inclusive thereunder.

I claim:

1. A trans-axle assembly, comprising: an integral transmission and axle housing having a pair of coaxially disposed and spaced gear members provided therein, means engaged with said gear members for driving them in opposite rotational directions, separately mounted gear toothed members provided between said oppositely driven gear members, axle driving means including a gear member engaged with said gear toothed members, and means for alternatively engaging one of said gear toothed members with one of said oppositely driven gear members.

2. A trans-axle assembly, comprising: an integral transmission and axle housing having a pair of coaxially disposed and spaced gear members provided therein, means engaged with said gear members for driving them in opposite rotational directions, a pair of separately operable and axially reciprocal clutch members disposed between said gear members and each having a gear toothed periphery, axle drive means including a pair of drive axles having bevel gears provided on the adjacent ends thereof, a bevel gear carrying bull gear rotatable on said drive axles and operatively engaged with said drive axle bevel gears, said bull gear also being operatively engaged to said clutch members, and means for alternatively engaging one of said clutch members with one of said oppositely driven gear members for driving said axles therethrough.

3. The trans-axle assembly of claim 1 comprising separate speed changing gear train assemblies operatively connected to said oppositely driven gear members and each including a gear member coaxially disposed and spaced with relation to a gear member of the other thereof, and one of said gear toothed members being reciprocal between said last mentioned gear members for operatively engaging one thereof with said axle driving gear member.

4. An axle drive, comprising: a housing having a pair of coaxially disposed and spaced side gear members and a single axle driving output gear provided therein, a clutch member provided between said side gear members for selective engagement therewith and between and disposed in drive engagement with said output gear, a separate gear member in drive engagement with one of said side gear members, a second clutch member operatively engaged with said output gear and disposed for selective engagement with said separate gear member, and operative means for selective actuating said different clutch members and cooperatively disposed for interrelated actuation thereof requiring the disengagement of one prior to the engagement of the other thereof with a receptive gear member.

5. A trans-axle assembly comprising: an integral transmission and axle housing including a pair of coaxially disposed and spaced bevel side gears having a bevel gear engaged therewith for driving said side gears in opposite rotational directions; a pair of axle shafts supported in said housing and having bevel drive gears provided near the adjacent ends thereof, a bevel gear carrying spur gear toothed member rotatably supported on and between said axle shafts and drivingly engaged therewith through said bevel drive gears; a spur gear toothed dog pawl clutch member rotatably mounted and reciprocal between said bevel side gears and operatively engaged with said axle driving gear member; means engaging said clutch member and operative thereof into driving engagement with either of said side gears; spur gear tooth portions provided on said side gears and separate gear trains engaged therewith, said gear trains each including a gear member coaxially disposed and spaced relative to a gear member of the other thereof and having a spur gear toothed and axially reciprocal clutch member disposed therebetween and engaged with said axle driving gear member, and means for selectively engaging one of said clutch members with one of the gear members between which they are respectively disposed for drive force transmission therethrough.

6. A multiple drive assembly, comprising: first and second pairs of coaxially disposed and spaced gear members each having an axially reciprocal clutch member disposed between the gear members thereof, the gear members of said first pair being driven by a common drive means, the gear members of said second pair being separately rotatable and operatively connected to different of the gear members of said first pair, said clutch members each including gear teeth and being engaged with a common output gear member, a shaft having separate clutch engaging and actuating members guided thereon and separately operable on respectively opposite sides of said shaft, a single lever member for engagement with and operation of said clutch actuating members, said shaft including an undercut portion, said lever member being of a length precluding passage between opposite sides of said shaft except through said undercut portion and said clutch actuating members being each formed to require the return thereof to a neutral position on said supporting shaft preceding the passage of said lever member therebetween.

7. A gear shift mechanism, comprising: a shaft having separate gear clutch operating members coaxially disposed thereon and operable on respectively opposite sides thereof, a common single lever member pivotally mounted and having one end thereof disposed for engagement and operation of different of said clutch operating members on opposite sides of said shaft, said shaft including an undercut portion intermediate the ends thereof, said lever member being of a length precluding passage of said one end between opposite sides of said shaft except through said undercut portion, and said gear clutch operating members being cooperatively formed to each require the return thereof to a neutral clutch operating position preceding the passage of said lever member for engagement therebetween.

8. A differential axle, comprising: an axle housing, aligned axle members having their adjacent ends received and supported within said housing, bevel toothed gear members provided on the adjacent ends of said axle shafts, an axle driving bull gear rotatably supported on the adjacent ends of said axle shafts, pinion gear receptive cut-outs provided within said bull gear, and bevel toothed pinion gears rotatably supported and axially self-adjustable within said cut-outs and disposed in driving engagement with said axle shaft gear members.

9. The differential axle of claim 8, including; radially disposed slots provided in said bull gear on opposite sides of said cut-outs, and pinion gear supporting pins having flat sided ends received in said slots for permitting relative axial freedom of movement for said pinion gears between said axle shaft gear members.

10. The differential axle of claim 9, including; means provided between said pinion gears and the outer disposed side of said cut-outs for biasing said pinion gears in frictional engagement with the inner disposed sides thereof.

11. A trans-axle assembly, comprising: an integral transmission and axle housing including a pair of coaxially disposed and spaced gear members having drive means provided therebetween and operative thereof in opposite rotational directions, axle driving means provided in said housing and including means of selective operational engagement with different of said spaced gear members for forward and reverse drive thereof and neutral positioning relative thereto, and speed changing means disposed within said housing for selective operational engagement with one of said spaced gear members and said axle driving means upon the neutral positioning of said first mentioned spaced gear engagement means.

12. A multiple speed forward and reverse drive assembly, comprising: a pair of bevel toothed side gear members disposed in coaxial spaced relation and having common drive means engaged therewith for rotation thereof in selectively opposite directions, a spur gear toothed clutch member disposed for axial reciprocation between said side gear members and selective splined end engagement therewith and for neutral positioning therebetween, a spur gear toothed output drive member having said spur gear toothed clutch member operatively engaged therewith, and spur toothed gear train means operatively engaged to said side gear members and disposed for speed ratio changing engagement with said output drive member when said clutch member is neutrally positioned, said gear train means including a gear member operatively disposed between one of said side gears and said output drive member and a separate pair of gear members operatively disposed between the other of said side gears and said output drive member.

13. The multiple speed forward and reverse drive assembly of claim 12 including, a second spur gear toothed clutch member axially reciprocal between the gear members of said gear train means disposed next adjacent said output drive member for selected splined end engagement therewith and neutral positioning therebetween, and said latter clutch member being operatively engaged to said output drive member.

14. The multiple speed forward and reverse drive assembly of claim 13 including, common operative means pivotally mounted and having an end thereof selectively operative of said clutch members and for the neutral positioning of one thereof prior to disposing the other thereof in an operative position.

15. The multiple speed forward and reverse drive assembly of claim 14 including, coaxially disposed means operatively engaged with said different clutch members and cooperatively disposed for selective actuation by said common operative means last mentioned.

16. The multiple speed forward and reverse drive assembly of claim 15 including, said coaxially disposed means including yoke members cooperatively disposed and having the pawl ends thereof operatively engaged to said different clutch members.

17. A gear shift mechanism, comprising: a shaft having separate clutch operative means provided on different sides thereof, common means transferable between different sides of said shaft and axially reciprocal relative thereto for selective and separate operative engagement with said clutch operative means, and means disposed for engagement by said common means and permitting the transfer thereof between said different shaft sides only following the neutral positioning of said clutch operative means.

18. The gear shift mechanism of claim 17, said last mentioned means being provided in one of said shaft and clutch operative means.

19. The gear shift mechanism of claim 17, said last mentioned means including a by-pass provided in said shaft permissive of the passage of said common means only therethrough.

20. The gear shift mechanism, of claim 17, said last mentioned means including an annular groove provided about said shaft and said common means including a lever pivotally mounted and having an end thereof operative of said clutch means transferable only therethrough.

References Cited by the Examiner
UNITED STATES PATENTS

| | | | |
|---|---|---|---|
| 1,169,072 | 1/16 | Fawick | 74—378 |
| 1,169,073 | 1/16 | Fawick | 74—378 |
| 1,415,606 | 5/22 | Nilson et al. | 74—378 X |
| 1,431,959 | 10/22 | Keim | 74—701 |
| 1,487,447 | 3/24 | Drumm | 74—378 |
| 1,490,375 | 4/24 | Foote | 74—701 X |
| 2,135,042 | 11/38 | Rossman | 74—473 |

DON A. WAITE, *Primary Examiner.*